United States Patent [19]

Grunwald

[11] 4,157,532

[45] Jun. 5, 1979

[54] METHOD OF MACHINE READING DOCUMENTS

[76] Inventor: Grete Grunwald, 1236 E. 85th St., Chicago, Ill. 60619

[21] Appl. No.: 775,243

[22] Filed: Mar. 7, 1977

[51] Int. Cl.² .............................................. G06K 9/08
[52] U.S. Cl. .......................................... 340/146.3 G
[58] Field of Search ................. 340/146.3 G, 146.3 Q, 340/146.3 MA, 146.3 R, 146.3 P; 250/567, 568, 570; 356/163, 168

[56] References Cited

U.S. PATENT DOCUMENTS

| | | | |
|---|---|---|---|
| 3,221,301 | 11/1965 | Moyroud | 340/146.3 G |
| 3,267,430 | 8/1966 | Howard | 340/146.3 G |
| 3,333,244 | 7/1967 | Brown, Jr. | 340/146.3 G |
| 3,469,263 | 9/1969 | King | 340/146.3 Q |
| 3,492,646 | 1/1970 | Bene et al. | 340/146.3 Q |

*Primary Examiner*—Leo H. Boudreau
*Attorney, Agent, or Firm*—Knechtel, Valentino, Demeur & Dallas

[57] ABSTRACT

The method of the present invention, in its broadest aspect, comprises the steps of generating a character mask or template of each of the printed characters to be machine read from the printed document which is to be machine read; providing with the template, in a machine readable format, labels in association with and identifying each of the character masks or templates; interrogating one line at a time of the printed document with the respective ones of the character masks or templates, to identify matches between the character masks or templates and the printed characters on that line of the printed document; and recording the label associated with and identifying a character mask or template each time a match is identified.

12 Claims, 4 Drawing Figures

METHOD OF MACHINE READING DOCUMENTS

This invention relates generally to machine reading systems for reading printed documents such as books, journals and the like, and more particularly, it relates to an improved method and manner of machine reading printed documents.

The need for and uses of machine reading systems are well known, and substantial research and development efforts have been devoted to improving such systems. While there are presently available a number of such machine reading systems, many, if not most, of these systems are very sophisticated and complex.

Generally, all machine reading systems require a scanning system for scanning the printed document, and a recognition system for identifying the unknown characters from the printed document. The scanning system normally is an optical system to view each character on the printed document in turn, sense its light pattern, convert this into an electrical pattern and store the sensing in an electronic storage area for further processing and recognition. There are presently a number of different scanning methods in use, including a "flying spot", a columnar array of photocells, a retinal array of photocells, stroke analysis, curve tracing with an electron beam, and character-image superimposition.

All of these different scanning methods are similar in many respects, in that all of them read characters as opposed to words. Also, each character is recognized by comparing its graphic or electronic image with a standard graphic or electronic image previously stored in the recognition system. In all of these scanning methods, the analog information is converted into digital information and this digital information is recorded or stored, usually on magnetic tape.

The recognition system of the machine readers includes a character mask and a decision generator. The character masks store the image of each character, in a manner such that an unknown character pattern can be compared quickly and accurately with each stored image. The decision generator makes the final determination as to the identity of the unknown character and signals the recording circuits to write the character in appropriate machine language code on, for example, magnetic tape.

It is well established that no machine reading system can duplicate the character recognition process of "eye plus brain," and transcribe alphabetical writing by merely substituting individual characters for appropriate systems indicating the same character in another format such as, for example, binary code.

While there are many obstacles for optical recognition of characters, there are three main obstacles that are well known. One is letter distance, that is, the letter distance within words varies since printers set letters for the purpose of appearance and for justification. Another is width variation of letter designs within an alphabet, and the third is almost-alikeness of the letters with parts of other letters within an alphabet.

In the development of machine reading systems, the most effort has been toward character recognition by map matching procedures. Each printed character, in turn, is projected and compared with a whole family of character masks until a match occurs, and then this character identity is searched for in the storage. This procedure is repeated as many times as there are characters on a printed line and, if a character occurs five times on a printed line, the same procedure must be repeated five times.

With this type of approach to optical scanning, i.e., searching for a character's identity by taking one print character at a time, in turn, a high price is paid to cope with the three main obstacles recited above. This approach requires additional equipment and complex procedures just for separating the characters on the printed line and for comparing the character masks and their specific characteristics.

Accordingly, in order to simplify such machine reading systems and further to enable such machine reading systems to "read" any type of printed document, it is necessary to reduce the uncertainty in all of the above-mentioned three major obstacles to machine reading.

In accordance with and a feature of the method of the present invention is the provision of an exceptionally close correspondence of the character mask and the printed character. This is achieved by generating the optical character mask, or electronic template, from the very printed document which is to be subsequently machine read, rather than to use a postulated or specified characteristics of the printed character to construct a character mask or template.

Another feature of the invention relates to the reduction, if not elimination, of the problem of almost-alikeness of characters. This feature is based on the observation that almost-alikeness, and alikeness in part, typically is not the same for both directions. For example, a scanning "l" template can mismatch with the vertical bar of a letter "b" or "h", but a scanning "b" or "h" template will not mismatch with the letter "l". Therefore, which character template scans first in checking for a match, in numerous cases, determines a correct match or mismatch.

According to the present invention, advantage of this fact is taken, and the common procedure of searching for identity of print characters, in turn, with a whole family of character masks or templates until a match is found is reversed. Instead, a whole print line of characters is scanned with one character mask or template, and on one scan of the print line, a match may be or can be found between that character mask and one or more print characters in that print line. Therefore, it is possible on one scan of a print line to obtain or establish an optimum number of matches. Also, those character masks corresponding to printed characters that comprise a portion of another print character (almost-alikeness) are arranged to be the first to scan the print line. Further still, in this respect, is another feature, namely, that those character masks corresponding to those print characters which normally occur with greater frequency are arranged to be the first to scan a print line.

Another feature of the invention relates to the provision of an information package on the template for each print character, which package includes the character design information, the identifying label, and a designation of the character width.

Another feature is that immediately with every match, the information on the template regarding the identity and character width of the character is recorded onto a buffer in machine readable form.

Another feature relates to the prevention of recording of spurious characters, i.e., of characters that would cause an output which does not correspond to the original by reading part of a character which is actually present for another character. The character width markings recorded on the buffer are used for this purpose in such a fashion that the recording means are deactivated or blocked whenever the buffer scanner perceives the presence of a character width mark. Thus, if the inclusive characters have already been interrogated and recorded, then a subsequent spurious match with parts of such characters does not result in another record and, thus, is of no consequence.

Still another feature is that the letter-spacing on the original document is retained in the machine readable output.

Other features will be apparent from the description below.

DESCRIPTION OF THE DRAWINGS

FIG. 1 is a plan view of a portion of the elongated strip containing the individual character masks or templates;

FIG. 4 is a schematic representation of apparatus for receiving and recording the chracter label and character width information in a buffer storage, and for subsequently reading out and recording the same on magnetic tape or the like.

Figure 2:
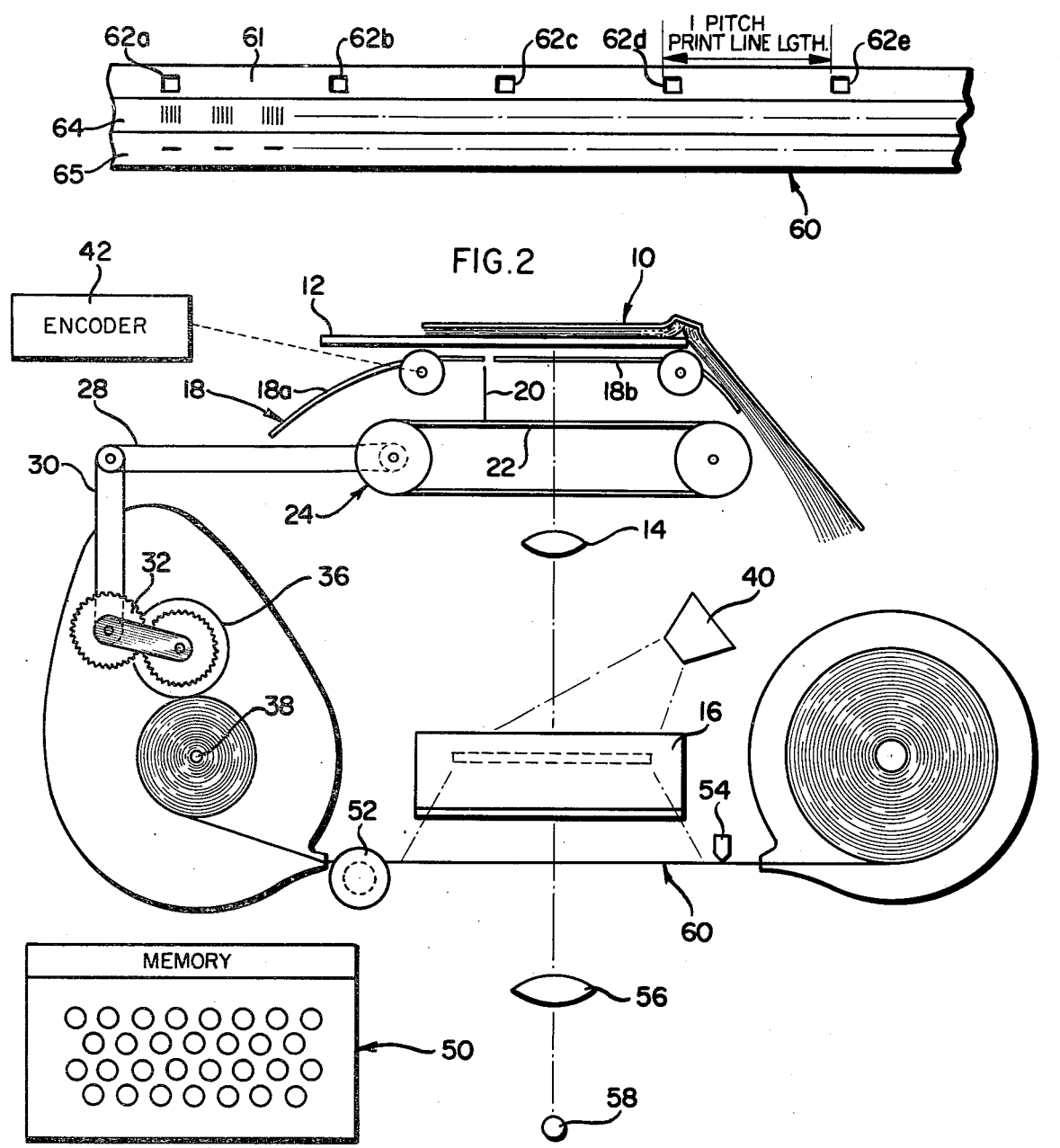
FIG. 2 is a schematic representation of apparatus for carrying out the method of the invention.

Generally, the method of the present invention, in its broadest aspect, comprises the steps of generating a character mask or template of each of the printed characters to be machine read from the printed document which is to be machine read; providing with the character mask or template, in a machine readable format, labels in association with and identifying each of the character masks or templates; interrogating one line at a time of the printed document with the character masks or templates, to identify matches between the character masks or templates and the printed characters on that line of the printed document; and recording the label associated with and identifying a character mask or template each time a match is identified.

As indicated above, there are presently in use a number of different scanning methods, and any one of these scanning methods can be used in carrying out the method of the present invention. Also, since components of such apparatus are commercially available, and the operation thereof in scanning printed documents is generally well known, such apparatus per se forms no part of the present invention. As far as the recognition systems which can be used in carrying out the method of the present invention, the same facts are generally true. Representative scanning methods and apparatus, as well as various different recognition systems, are generally disclosed and described in the book entitled "Optical Page Reading Devices" by Robert A. Wilson, published by Reinhold Publishing Corporation in 1966. While improvements are made in the manner in which the printed document is scanned and in the format or design of the character masks or templates, these changes are well within the skill of those skilled in the art.

As indicated above, according to the method of the present invention, the character masks or templates are generated from the very document which is to be subsequently machine read, preferably on or with the same apparatus which is subsequently used to recognize the printed characters on the document. In doing so, a very close correspondence between the printed characters and the character masks or templates is provided, and the problems, previously encountered when such character masks or templates are generated from standard established printer's fonts or design specification, are substantially eliminated.

For example, an optical character mask or electronic template of the printed characters can be prepared in conventional fashion, however, in this case, the character masks or templates are generated from the printed document which is to be subsequently machine read. An operator is required, for reasons which will be apparent, however, even so, the method is nevertheless much more efficient than other existing systems.

In preparing or generating the character masks or templates, the operator searches the printed document for each of the respective characters and, upon locating and isolating them, generates not only the character mask or template of the printed character but, in addition, records a label which identifies the character, and a character width mark related to the width of the character of which the mark is being made, both of which are recorded in a machine readable code with the template.

In this respect, and for other reasons, the character masks or templates preferably are positioned into an elongated strip 60 (FIG. 1) which is divided throughout its length into an opaque band 61 having spaced-apart transparent windows 62 which are, for instance, covered with a photographic emulsion or the like, and a two track strip 64 and 65 which is coated with a magnetic medium. An all magnetic tape equivalent to the partly photographic template package could comprise a binary encoded bit pattern corresponding to the one generated by, say, a flying spot scanning operating on the corresponding character in lieu of the photoanalog. The character masks are generated in the "transparent" windows 62 and the label and the character width machine readable codes are recorded on the two track magnetic strip 64 and 65 in association with the respective character masks.

More specifically, in FIG. 2, there is generally represented apparatus illustrative of apparatus which may be used to carry out the present invention, although, as indicated above, such apparatus per se forms no part of the present invention since such apparatus is generally well-known. Furthermore, various different ones of existing apparatus can be easily modified to generate the character masks and to subsequently read a printed document, in accordance with the teachings of the present invention.

Such apparatus may include, for example, a support surface, such as the glass plate 12, for supporting the document from which the character masks 62 are to be generated and which is subsequently to be machine read. In this illustrated embodiment, an optical character mask is generated and a document, in this case, a book 10, is placed with one page thereof face down on the glass plate 12, and such that one print line of that page is reflected or projected by a lens 14 onto a mirror and shutter assembly 16 and, upon operation of the latter, onto the elongated strip 60 including the character masks 62.

A split masking strip 18 including masking strips 18a and 18b which are movable with respect to one another to define between the adjacent ends thereof an opening which is variable in width is disposed beneath the plate glass 12. The split masking strip 18 is used to isolate the individual print characters which are to be projected onto the elongated strip 60, so that only one print character at a time is projected, in a manner more specifically described below. A pointer 20 can be provided to assist an operator in aligning the projected image of a print character with the next open position or transparent window 62. The pointer 20 is affixed to an endless conveyor-type track 22 which is carried by a pair of spaced-apart gears 24 and 26, with the gear 24 being coupled to and rotated by drive chains 28 and 30. The drive chain 30 also is coupled to and rotated by a gear 32 which is, in turn, coupled by means of a lever arm 34 to a gear 36. The gear 36 is coupled to and rotated by an adjustment knob 38 forming part of the spool upon which the elongated tape 60 is wound, so that the printer 20 is moved when the operator manually rotates the adjustment knob 38 to advance or retract the elongated strip 60. An eyepiece 40 also is provided, whereby the operator can observe the image of both the pointer 20 and the print character projected onto the mirror and shutter assembly 16.

Figure 3:
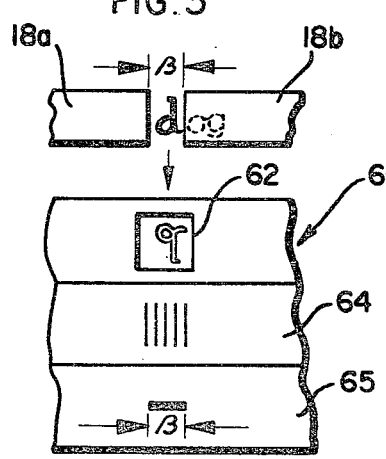
FIG. 3 is a view generally illustrating the manner in which a print character image is restricted during the generation of the character mask or template.

In generating the individual character masks 62, the operator singles out one of the print characters on the print line, by adjusting the split masking strip 18 so that the opening between the adjacent ends of the masking strips 18a and 18b restricts the image of the print character which is projected onto the elongated strip 60, as generally illustrated in FIG. 3. It can be seen that the adjacent ends of the masking strips 18a and 18b define an opening which restricts or defines how much or what portion of the print character is actually reflected or projected onto the elongated strip 60.

The elongated strip 60 is manually advanced by the operator, by means of the adjustment knob 38, to align one of the transparent windows 62 with the projected image of the print character, with the assistance of the eyepiece 40 and the pointer 20, so that the image of the print character and the transparent window are aligned with one another, as generally illustrated in FIG. 3. The operator then operates the mirror and shutter assembly 16 to open the shutter to photograph or record the image of the print character in the transparent window to thus generate or provide a character mask corresponding to that projected print character. The remaining character masks are generated in a like fashion.

As indicated above, associated with each character mask 62 is a character label and character-width machine readable code which is recorded on the two magnetic track strips 64 and 65 on the elongated strip 60, respectively. The character-width signal is generated by an encoder 42 which is associated with the split masking strip 18 and is operable to generate a signal $\beta$ which corresponds to the width of the opening between the adjacent ends of the masking strips 18a and 18b. In other words, the encoder 42 is coupled to and operated by the masking strip 18 to generate an output signal which has a duration corresponding to the width of the opening between the adjacent ends of the masking strips 18a and 18b, and this signal is coupled to a temporary memory forming part of a keyboard 50, wherein it is temporarily stored.

The operator likewise keys into the temporary memory, via the keyboard 50, a character label associated with the print character. The operator then operates the mirror and shutter assembly 16 to open the shutter to photograph or record the print character, as described above. Simultaneously an advance switch 52 which automatically advances the elongated strip 60 one pitch length, i.e., the distance between two transparent windows 62 to the next transparent window 62, is operated. The advance switch 52 also triggers the read out of the temporary memory to output the character label and character width information stored therein to the write/read heads 54 (only one of which is illustrated), to record this information on the respective ones of the track strips 64 and 65 on the elongated strip 60, in a repetitive fashion until the elongated strip 60 has been advanced the one pitch length. As indicated above, the character label is recorded in a binary code, while the character width is simply a signal $\beta$ of an established length. The manner in which this information is recorded on the elongated strip 60 is generally illustrated in FIGS. 1 and 3.

As indicated above, during the generation or preparation of the individual character masks or templates, the area thereof onto which the character image is imposed is restricted so that only that defined or limited width of the character image is accommodated and recorded. By preparing the character masks or templates in this fashion, the need to single out individual print characters for interrogation, as in the past, is eliminated. A character mask or template which is restricted in accordance with the invention will momentarily "match" a print character perfectly whose lateral extremities are indistinct, as for example, they would be if they touch or run together with an adjacent print character or characters, as illustrated in FIG. 3. Without such a restriction, it is necessary to first define the width limits of the print character to be identified, otherwise, the detection apparatus is provided "images" containing fractions of several print characters. Obviously, such "images" do not correspond to any reference "known" to the detection apparatus. With the character masks or templates of the present invention, this problem existing with present methods is eliminated, for no such "images" are provided to the detection apparatus.

The totally opaque or inactive sections of the elongated strip between the individual character masks or templates are also helpful in minimizing "noise" pickup during the recognition process. Any dirt, ghost images and other spurious information competes with "image or images" to be recognized in generally the same fashion as fragments of adjacent print characters, even if it is attenuated. By making the elongated strip completely opaque or inactive outside of the area thereof necessary to record only the image of the print characters, such "noise" is reduced to a minimum.

As indicated above, according to several further features of the invention, in generating the character masks or templates, the latter are disposed or positioned on the elongated strip such that those characters which normally appear most frequently, and those characters which comprise a portion or all of another character (almost-alikeness), are at the start or beginning thereof so that they are the first to scan. Preceding any of these character masks or templates, however, is a "blank space template" which interrogates a line of a document for spaces between words as well as paragraph indentations and/or endings, all as more fully explained below. A prepared schedule may be provided the operator to assist in generating the character masks or templates, in the order described.

Also, in accordance with another feature of the invention, as described above, the respective ones of the character masks or templates are spaced-apart on the elongated strip a distance at least equal to or greater than the line length of the printed document to be read.

With this arrangement, as more fully described below, only one character mask or template at a time scans a print line of the document.

Now that the method and manner in which the character masks or templates are generated have been described, preferably on an elongated strip, the method of machine reading a printed document in accordance with the invention and its attendant advantages can be described, generally as follows.

Preferably, the printed document 10 is machine read using the same apparatus used to generate the character masks or templates 62, so that there is direct correspondence between that which was previously read to generate the character masks or templates and the printed characters which are to be scanned. For example, as can be seen in FIG. 2, the printed document which is to be machine read is placed on the glass plate 12 and positioned such that one print line is reflected or projected onto the elongated strip 60, via the lens 14 and the mirror and shutter assembly 16. A lens 56 is disposed beneath the elongated strip 60 and is positioned to direct any light passing through the elongated strip 60, i.e., the character masks 62, onto a photocell 58. Now, as each character mask 62 passes over the projected images of the print characters, some light passes through the character masks since the letter, numeral, etc. forming the character masks is clear while everything else is opaque. This light is focused and impinged on the photocell 58. However, when the character mask moves over a print character with which it corresponds, the light is momentarily much brighter and is focused onto the photocell 58. The output of the photocell therefore has a short but distinct dip, indicating a match. This dip actuates or triggers the write/read heads 54 to read out to a buffer storage 66 the character label and character width information recorded on the track strips 64 and 65 and associated with that character mask 62, all as more fully described below. Generally, in accordance with the invention, a whole line of the printed document is interrogated at one time, by each of the character masks or templates, in turn, until all of the printed characters on that line, i.e., all of the spaces, letters, numerals, and punctuations have been recognized and identified. Each subsequent line then is interrogated in a corresponding fashion.

A buffer storage 66 is provided for storing the machine readable code related to the label and character width of each print character on a print line of a document. When the buffer storage 66 is full, the indication and detection of which is described below, the entire print line has been recognized and identified. At this time, the buffer storage 66 is dumped and stored on a magnetic tape or other recording medium 68, and the equipment is reset to read the succeeding line of the printed document 10.

More specifically, the printed document 10 is interrogated or scanned, one line at a time, with the character masks or templates 62 on the elongated or endless strip 60. Since the character masks or templates 62 are disposed thereon in spaced apart relationship at a distance equal to or greater than the pitch on line length of a line on the printed document 10, only one character mask or template 62 at a time scans or interrogates the printed characters on that one line. As that character mask or template 62 interrogates the respective ones of the printed characters, one or more matches with a printed character may occur. In other words, if the character mask or template 62 corresponds to the letter "E", and the letter "E" appears four times on that one line, four matches will be recognized. As each match is recognized, that character's label and character width will be recorded in the buffer storage 66, in each of the four locations therein corresponding to the locations of that character in the line. The next character mask or template 62 on the elongated strip 60 then interrogates that one line and any matches recognized are recorded in the buffer storage 66, in the same fashion.

Accordingly, it can be seen that scanning or interrogating one line of a printed document 10 in this fashion provides numerous advantages over other existing systems. For example, it is first of all obvious that a substantially faster scanning rate is provided, since a whole family of character masks or templates 62 do not have to be interrogated with each printed character in order to find a match. Secondly, if the same character appears several times on a printed line, it is not necessary to interrogate these characters each time with the whole family of character masks or templates 62. This is only one of the features which improves the scanning rate.

It may also be stated that by scanning in this fashion, the scanning can be easily multiplexed, i.e., several lines can be scanned simultaneously, simply by duplicating some portion of the apparatus so that the information packages related to the print characters in the respectively scanned lines can be recorded and subsequently dumped and recorded in proper sequence. This particular feature is unique to the method of the present invention, and only results from the fact that an entire line length is scanned by only one character mask or template 62, before the line is scanned by another or next character mask or template 62.

The scanning rate also is increased in view of the fact that those character masks or templates 62 which correspond to letters or print characters which normally appear with greater frequency are positioned at the start of the elongated or endless strip 60. As a result, those print characters are the first to be matched, thus the buffer storage 66 is filled much more quickly. The quicker the buffer storage 66 is filled, the sooner the next line on the printed document 10 is interrogated. Accordingly, the time to scan or interrogate the entire printed document 10 is substantially reduced.

Mismatches are effectively prevented as a result of the fact that the character masks or templates 62 corresponding to print characters or letters which comprise portions of other print characters or letters (almost-alikeness) also are positioned at the start of the elongated strip 60, before their almost-alikes. That is, for example, the character masks or templates 62 corresponding to the print characters or letter "b" and "h" precede on the elongated strip 60 the character masks or template 62 corresponding to the letter "l". Therefore, the letters "b" and "h" will be recognized and their machine readable codes identifying their labels and character widths will be recorded first in the buffer storage 66. Now, should these same letters be interrogated with the character mask or template corresponding to the letter "l", a mismatch is prevented since the buffer storage location already is full and a further attempted recording is "blocked."

More specifically, as indicated above, a part of the information package which is recorded with respect to each of the character masks or templates 62 is the character-width associated with each print character. When a match is recognized, the print character's label and character-width both are recorded in the buffer storage 66. The scanning apparatus and the buffer storage 66 are "coupled" in a fashion such that the records entered in the buffer storage 66 "map" the location of the recognized print character in the line of the document.

Accordingly, the "track" formed by the recording of the respective character-width codes corresponding to the recognized print characters becomes essentially continuous and its length matches that of line length of the line of the document when all of the print characters of that line are recognized. This "track" is essentially continuous for it actually has "gaps" which, however, are narrower in width then the least expansive character image.

This "track" is continuously scanned or monitored during operation, to prevent mismatches from being recorded, as described above. More particularly, if a subsequent match is recognized, and the match is erroneous, the previously recorded character width in the corresponding location operates to "block" the recording of the subsequent match information in the buffer storage 66.

Also, by scanning or monitoring this "track" in the buffer storage 66, it can be detected when the buffer storage 66 is full, i.e., all of the print characters in a line of a printed document have been identified. When this condition is recognized or detected, scanning is stopped, the buffer storage 66, i.e., the label information recorded therein, is dumped and recorded on a magnetic tape or other recording medium, and the apparatus reset for scanning the next line.

Figure 4:
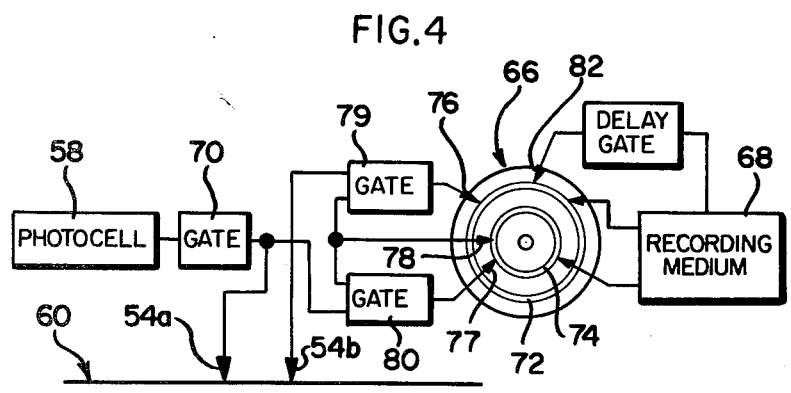

More particularly, in FIG. 4, there is generally illustrated apparatus for temporarily recording the character label and character width information, in the manner described above. The photocell 58 is coupled to a gate circuit 70 which is operated to trigger the write/read heads 54 to read the information recorded on the track strips 64 and 65 in association with the character mask 62. This information is coupled to and recorded on the respective magnetic tracks 72 and 74 of the buffer storage 66, by means of the write heads 76 and 77. The diameter of the magnetic track 74 and the distance between the character masks 62 on the elongated strip 60 are proportioned and the rotation of the buffer storage 66 and the advancement of the elongated strip 60 are synchronized and coordinated so that the buffer storage 66 makes one complete revolution as the elongated strip 60 advances a length equal to the length of a print line. Accordingly, when a match is detected, the character width information is recorded in the buffer storage in the location corresponding to the print character's location in the print line. The recording of the character width codes forms the above-described "track" which is essentially continuous when all of the locations are filled. This "track" is continuously monitored by, for example, read head 80 whose output is coupled to the gates 79 and 80. If a previously recorded character width marking in a corresponding location is detected, the gates 79 and 80 "block" the recording of a subsequent match information in the buffer storage 66.

This "track" in the buffer storage 66 also is monitored by, for example, read head 82 whose output is coupled to a delay gate 83 which has a delay which is slightly longer than the smallest "gap", i.e., narrower in width than the least expansive character image. Accordingly, the recording medium 68 is triggered to read out the buffer storage 66 only when the latter is filled.

In the event some of the print characters in a line have not been recognized even though all of the character masks or templates 62 have scanned the line, the apparatus is automatically stopped. At this point of time, the operator intercedes and keys in the missing information. If the stoppage was the result of the occurrence of a print character on the document which is not incorporated in the set of character masks or templates 62, the operator can update the set to include this character. Alternatively, if the stoppage was the result of the poor quality of a character mask or template 62, which condition can be recognized by persistently failing to recognize a particular print character, the operator may simply add another better character mask or template 62 corresponding to that character to the set.

The description above, particularly with respect to the character mask 62, relates specifically to an optical character mask. However, it is readily apparent that an electronic template can as well be generated. Accordingly, the terms character mask and template as used in the specification are used interchangeably, in a generic sense, and are not intended to be restrictive terms.

It will thus be seen that the objects set forth above, among those made apparent from the preceding description, are efficiently attained and certain changes may be made in carrying out the above method. Accordingly, it is intended that all matter contained in the above description shall be interpreted as illustrative and not in a limiting sense.

Now that the invention has been described, what is claimed as new and desired to be secured by Letters Patent is:

1. A method of machine reading of documents having thereon printed characters comprising the steps of:
   (a) generating a plurality of templates corresponding to the respective ones of the print characters on a document which is to be subsequently machine read from that document, each of said templates being generated on an elongated strip and spaced apart thereon a distance substantially corresponding to the length of a line of that document;
   (b) providing on said elongated strip in association with each of said templates a machine readable label indentifying each of said corresponding print characters;
   (c) interrogating one line of the document at a time with the respective ones of said templates to identify matches between said templates and the print characters on the document, whereby one line is interrogated by only one template at a time for matches between that template and the print characters on the document; and
   (d) recording whichever label is associated with a template on the strip each time a match between its template and a print character on the document is identified.

2. The method of claim 1, further comprising the step of:
   (a) adding to said elongated strip a template corresponding to a blank space, whereby a line on a document can be interrogated for spaces between words, paragraph indentations and paragraph endings.

3. The method of claim 2, further comprising the step of:
   (a) recording the label associated with and identifying a print character each time a match is identified in a buffer storage at a storage location therein corresponding to the location of the matched print character in the line length.

4. The method of claim 3, further comprising the steps of:
   (a) transferring the recorded data stored in the buffer storage to storage means each time the storage locations of the buffer storage are filled to thereby provide further storage of the recorded data; and then
   (b) interrogating the succeeding line in the document with the templates in a corresponding fashion.

5. The method of claim 3, further comprising the steps of:
   (a) providing on each of said templates in a machine readable format a character width in association with and related to each of the print characters, said character width being related to the width variation of letter designs within an alphabet; and
   (b) recording in said buffer storage the character width associated with and related to a print character when a match is identified.

6. The method of claim 5, further comprising the steps of:
   (a) monitoring said buffer storage; and
   (b) blocking the recording of a subsequent character width in the corresponding location in said buffer storage wherein a character width previously was recorded, thereby preventing mismatches from being recorded.

7. The method of claim 6, further comprising the steps of:
   (a) monitoring said buffer storage;
   (b) detecting when said buffer storage is full; and
   (c) dumping and recording on a recording medium the label information recorded therein.

8. The method of claim 7, further comprising the step of:
   (a) resetting said buffer storage and said elongated strip comprising said templates to the initial start position thereof, for scanning a succeeding new line of the document.

9. The method of claim 8, further comprising the steps of:
   (a) stopping the elongated strip comprising said templates when a line has been scanned by all of said templates and not all of the print characters on said line have not been recognized; and
   (b) having an operator intercede and key in missing information.

10. The method of claim 9, further comprising the steps of:
    (a) scanning several lines simultaneously; and
    (b) recording the label and character width information associated with the print characters in the respective lines in separate buffer storages, whereby more than one line of a document can be scanned at one time.

11. The method of claim 5, further comprising the step of:
    (a) positioning said templates on the elongated strip with the templates appearing with the greatest frequency as the first templates on the elongated strip.

12. The method of claim 5, further comprising the step of:
    (a) positioning the templates on the elongated strips with the templates of the print characters which are equal to some portion of another print character to succeed the latter, whereby the print characters which contain a portion of another print character are first identified, and the label and character width associated therewith are recorded in the buffer storage, thereby preventing a subsequent mismatch by blocking further recording in the buffer storage.

* * * * *